United States Patent
Pritchett et al.

(10) Patent No.: US 6,947,721 B2
(45) Date of Patent: Sep. 20, 2005

(54) WIRELESS COMMUNICATIONS WITH TRANSCEIVER-INTEGRATED FREQUENCY SHIFT CONTROL AND POWER CONTROL

(75) Inventors: Samuel D. Pritchett, La Jolla, CA (US); Jeffrey A. Schlang, Dallas, TX (US); Francesco Dantoni, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 547 days.

(21) Appl. No.: 09/852,927

(22) Filed: May 10, 2001

(65) Prior Publication Data

US 2002/0009983 A1 Jan. 24, 2002

Related U.S. Application Data

(60) Provisional application No. 60/204,298, filed on May 15, 2000.

(51) Int. Cl.[7] .................................................. H04B 1/16
(52) U.S. Cl. ................................. 455/343.1; 455/343.2; 455/127.1
(58) Field of Search .......................... 455/343.1, 343.2, 455/522.1, 127.1, 127.5, 296, 334, 23, 343.3, 343.4, 343.5, 13.4, 276.1, 522, 574, 86; 375/270, 141, 222, 224, 324

(56) References Cited

U.S. PATENT DOCUMENTS

| | | | | |
|---|---|---|---|---|
| 4,074,199 A | * | 2/1978 | de Jager et al. ............. | 375/270 |
| 4,278,978 A | * | 7/1981 | Frosch et al. ............. | 455/276.1 |
| 5,381,459 A | * | 1/1995 | Lappington ............... | 455/426.1 |
| 5,428,820 A | * | 6/1995 | Okada et al. ............. | 455/343.2 |
| 5,504,776 A | * | 4/1996 | Yamaura et al. ............. | 375/141 |
| 5,592,173 A | * | 1/1997 | Lau et al. ................. | 455/343.2 |
| 5,737,323 A | * | 4/1998 | Lansdowne .................. | 455/574 |
| 5,796,783 A | * | 8/1998 | Crawford ...................... | 455/23 |
| 6,029,061 A | * | 2/2000 | Kohlschmidt ................ | 455/574 |
| 6,343,207 B1 | * | 1/2002 | Hessel et al. .................. | 455/86 |
| 6,400,734 B1 | * | 6/2002 | Weigand ...................... | 375/324 |
| 6,453,182 B1 | * | 9/2002 | Sprigg et al. ................ | 455/574 |
| 6,564,046 B1 | * | 5/2003 | Chateau ....................... | 455/574 |
| 6,567,480 B1 | * | 5/2003 | Brardjanian et al. ........ | 375/324 |
| 6,615,060 B1 | * | 9/2003 | Usui ........................... | 455/574 |
| 6,658,244 B2 | * | 12/2003 | Schmal et al. .............. | 455/296 |
| 2003/0232612 A1 | * | 12/2003 | Richards et al. ............ | 455/323 |
| 2004/0002312 A1 | * | 1/2004 | Li et al. ...................... | 455/334 |
| 2005/0047358 A1 | * | 3/2005 | Pattabiraman et al. ... | 455/343.1 |

* cited by examiner

*Primary Examiner*—Edward F. Urban
*Assistant Examiner*—Lana Le
(74) *Attorney, Agent, or Firm*—Ronald O. Neerings; Wade Jame Brady, III; Frederick J. Telecky, Jr.

(57) ABSTRACT

Baseband processor and communication overloading can be relieved in a portable wireless communication terminal by decentralizing power control (38, 39) and frequency shift control (75) functions that are conventionally concentrated in the baseband processor. A timing sequencer (31) for power control can be integrated into a transceiver of the portable wireless communications terminal, thereby advantageously permitting power control signals to be generated on the transceiver side (27, 29) rather than the baseband processor side. Shadow registers (74) containing information indicative of commonly used or repeated frequencies can be integrated into the transceiver side, thereby advantageously relieving the baseband processor of corresponding frequency shift control responsibilities. These responsibilities can be further relieved by integrating into the transceiver side a sequencer (86) cooperable with the shadow registers for controlling frequency shifting of a frequency generator on the transceiver side, and by integrating into the transceiver side further shadow registers (85) for programming the sequencer with desired frequency shift sequences.

34 Claims, 5 Drawing Sheets

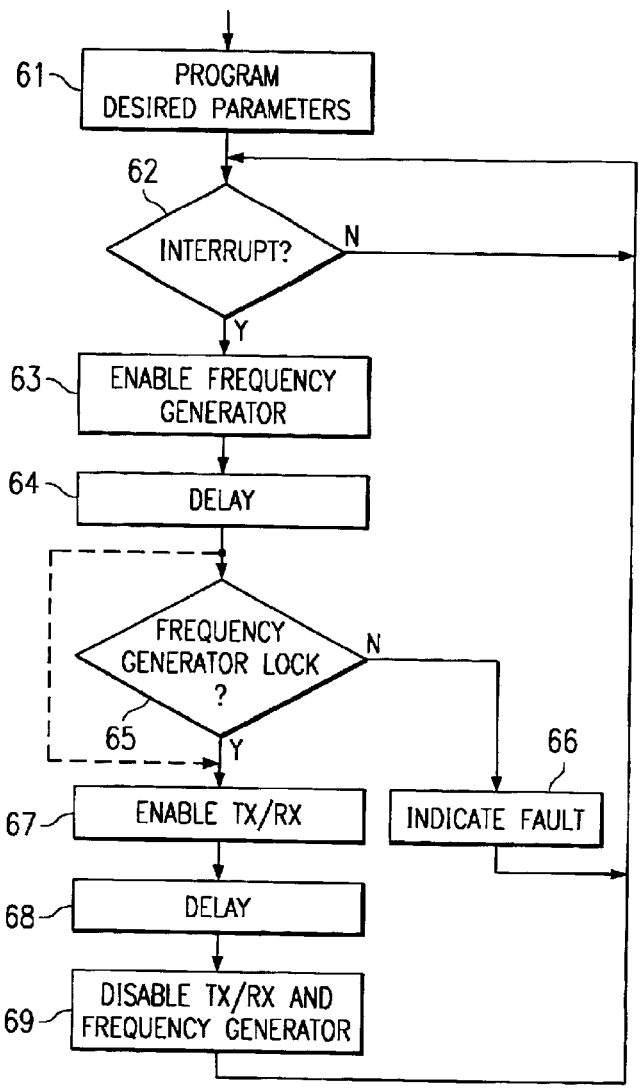
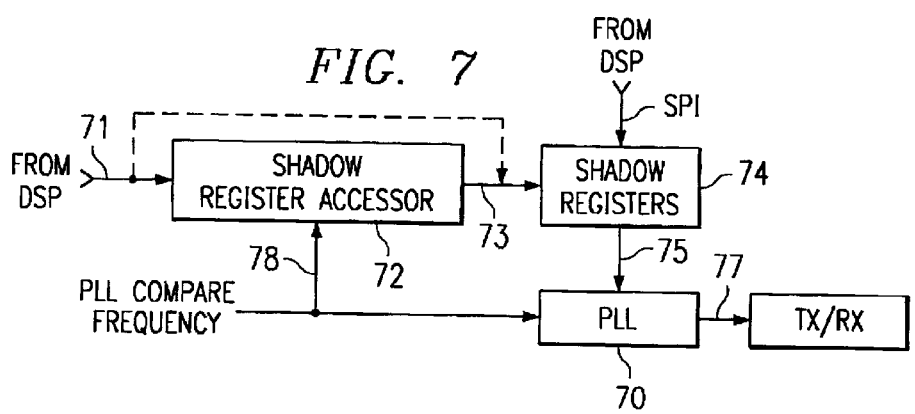

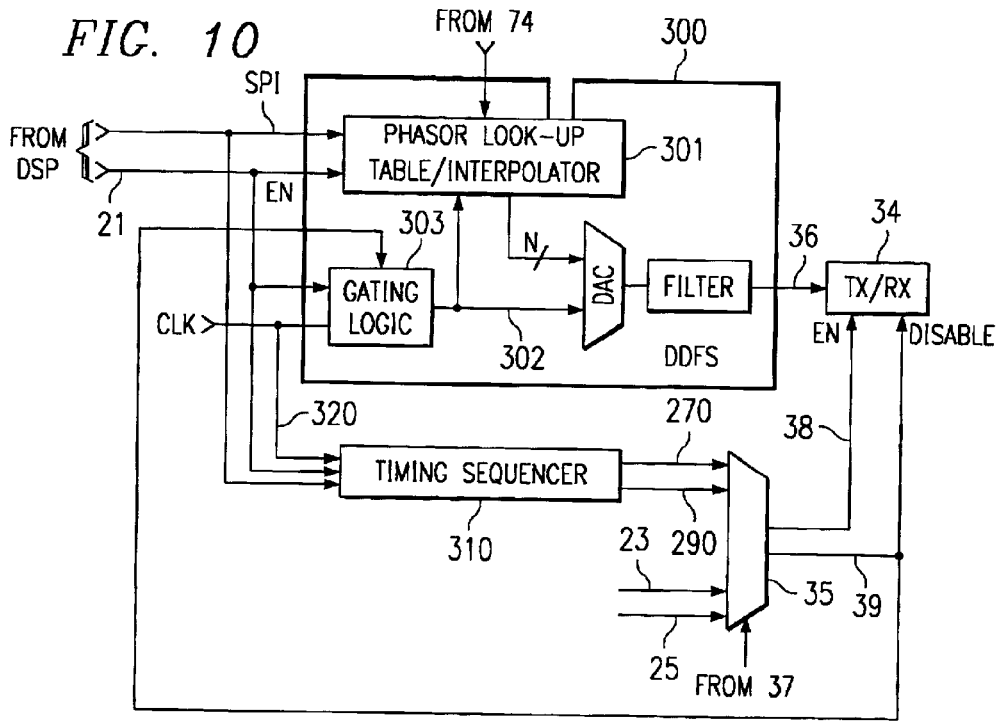
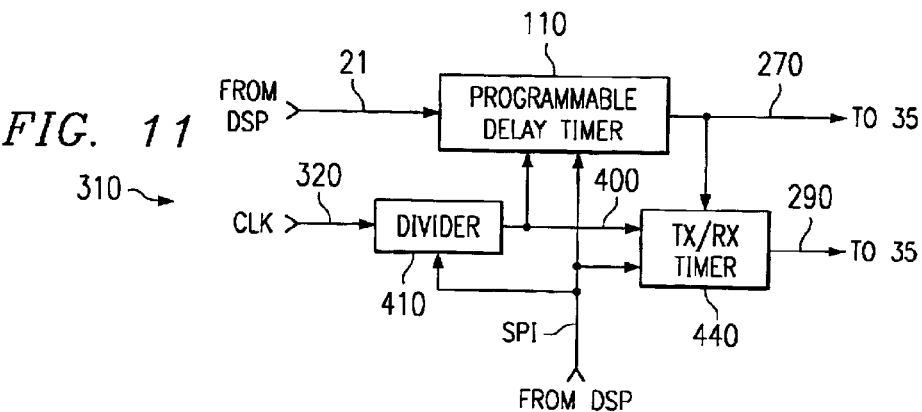
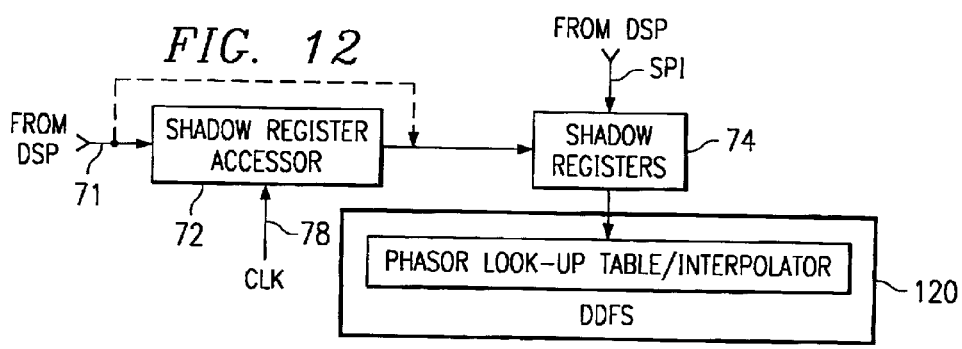

WIRELESS COMMUNICATIONS WITH TRANSCEIVER-INTEGRATED FREQUENCY SHIFT CONTROL AND POWER CONTROL

This application claims the priority under 35 U.S.C. 119(e)(1) of copending U.S. provisional application No. 60/204,298 filed on May 15, 2000.

FIELD OF THE INVENTION

The invention relates generally to wireless communications and, more particularly, to power and frequency control in portable wireless communications terminals.

BACKGROUND OF THE INVENTION

Conventional portable wireless communication terminals include a communications transceiver such as a radio frequency transceiver which is responsible for transmitting and receiving wireless communications. The transceiver is typically coupled to a baseband processor, for example a digital signal processor (DSP).

Power consumption in portable wireless communication terminals is of course a critical issue. It is important to enable and disable the various power-intensive transceiver functions in a very precise manner so that a given function is enabled only when (and for as long as) needed, and is otherwise maintained in a sleep (powered-down) state. This precise enabling and disabling of the various transceiver functions is conventionally controlled by the baseband processor, for example, by invoking software interrupts within the baseband processor that are necessary to initiate messaging by way of SPI (Serial Programming Interface), GPIO (General Purpose Input Output), State Machine, etc. to change the power state of various transceiver functions. For example, as shown in FIG. 2, a given transceiver function is conventionally initiated and executed in response to a sequence of 3 interrupt signals received from the baseband processor (DSP in this example). The first interrupt signal 21 causes the associated phase locked loop (PLL), or other frequency generator, to awake from its sleep state at 22. Thereafter, a second interrupt signal 23 causes the remainder of the function (e.g. a receiver function) to power up from its sleep state at 24, and a third interrupt signal 25 causes the function to power down (and thereby return to its sleep state) at 26 after the function has completed its operation.

The number of interrupt signals required to precisely control the power-up and power-down operations of the various transceiver functions has been found in practice disadvantageously to overload the precision timing control capabilities of the baseband processor and degrade overall system power consumption.

Another conventional situation which tends to disadvantageously burden the processing capabilities of the baseband processor is that many emerging wireless data applications often require a transceiver's frequency generator to shift between a small group of frequencies relatively rapidly at predetermined intervals. In conventional wireless communication terminals, the baseband processor must generate and communicate to the transceiver information indicative of the desired group of frequencies and further information indicative of the predetermined time intervals. For example, for each shift from one frequency to another, the baseband processor must communicate to the transceiver (1) that the time for the next frequency shift has arrived, and (2) the frequency to which the frequency generator must shift. This information is communicated from the baseband processor to the transceiver for each frequency shift in a relatively rapid sequence of frequency shifts. Such operation has been found in practice disadvantageously to overload the baseband processor's timing control facilities, and has also been found to consume a disadvantageously large portion of the communication bus between the baseband processor and the transceiver.

It is desirable in view of the foregoing discussion to provide a way of relieving the aforementioned baseband processor and communication bus overloading that can occur in conventional transceiver power control and frequency shift control operations.

According to the invention, baseband processor and communication overloading can be relieved by decentralizing power control and frequency shift control functions that are conventionally concentrated in the baseband processor. A timing sequencer for power control can be integrated into a transceiver of a portable wireless communications terminal, thereby advantageously permitting suitable power control signals to be generated on the transceiver side rather than the baseband processor side. Also, shadow registers containing information indicative of commonly used or repeated frequencies can be integrated into the transceiver side, thereby advantageously relieving the baseband processor and the communication bus of corresponding frequency shift control responsibilities. These frequency shift control responsibilities can be further relieved according to the invention by integrating into the transceiver side a sequencer cooperable with the shadow registers for controlling the frequency shifting of the frequency generator, and by integrating into the transceiver side further shadow registers for programming the sequencer with desired frequency shift sequences.

BRIEF DESCRIPTION OF THE DRAWINGS

FIG. 6 illustrates exemplary operations which can be performed by the timing sequencer of FIGS. 3 and 4.

FIG. 7 diagrammatically illustrates pertinent portions of further exemplary embodiments of a transmitter/receiver according to the invention for use in a portable wireless communications terminal.

FIG. 10 diagrammatically illustrates pertinent portions of further exemplary embodiments of a transmitter/receiver according to the invention in a portable wireless communications terminal.

FIG. 11 diagrammatically illustrates pertinent portions of exemplary embodiments of the timing sequencer of FIG. 10.

FIG. 12 diagrammatically illustrates pertinent portions of further exemplary embodiments of a transceiver/receiver according to the invention for use in a portable wireless communications terminal.

DETAILED DESCRIPTION

Figure 1:
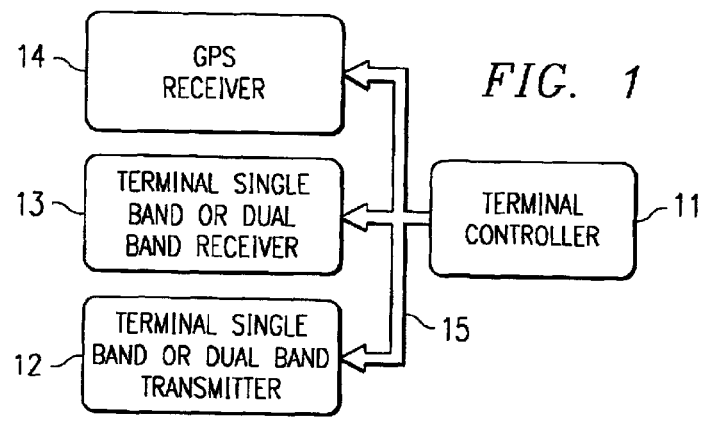
FIG. 1 diagrammatically illustrates exemplary transceiver and baseband processing portions of a portable wireless communications terminal according to the invention.

FIG. 1 diagrammatically illustrates pertinent portions of an exemplary portable wireless communications terminal according to the invention. The baseband processor, for example a DSP or MCU (microprocessor or microcontroller), is provided in the terminal controller 11. The terminal controller 11 is coupled to a transmitter 12, a receiver 13 and a GPS (Global Positioning System) receiver 14 by a communication bus designated generally at 15. According to the invention, power control and frequency control functions applicable to the transmitters and receivers at 12, 13 and 14 are advantageously integrated into those components in order to relieve undesirable overloading of, for example, the communication bus 15 and the baseband processor of the terminal controller 11.

Figure 3:
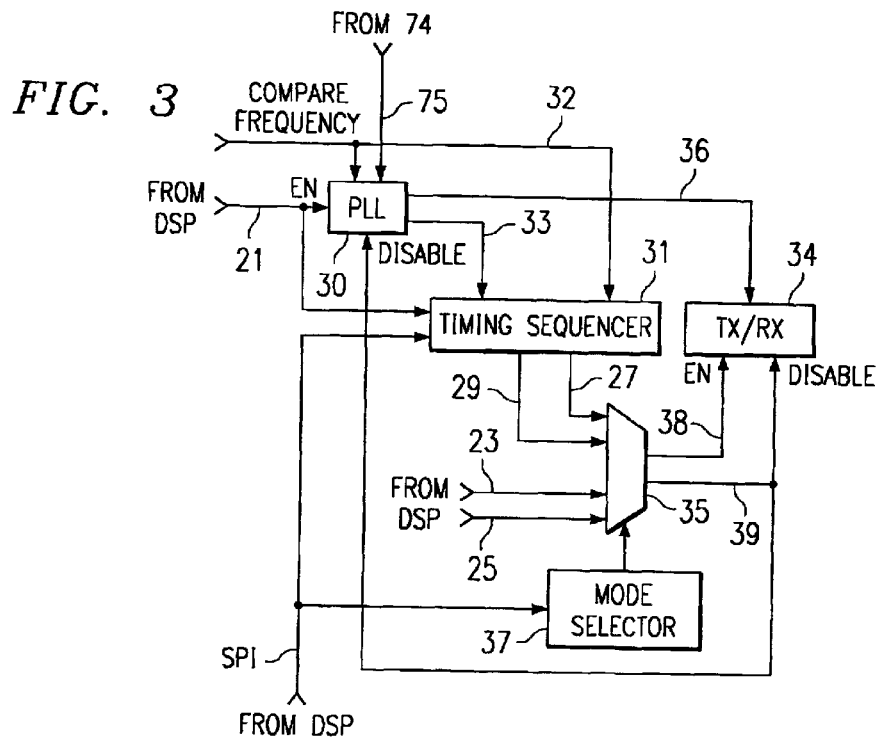
FIG. 3 diagrammatically illustrates pertinent portions of exemplary embodiments of a transmitter/receiver according to the invention for use in a portable wireless communications terminal.

FIG. 3 diagrammatically illustrates pertinent portions of exemplary embodiments of a transmitter, receiver or transceiver according to the invention. FIG. 3 is representative, for example, of any of the components 12, 13 and 14 illustrated in FIG. 1. Each of the components 12, 13 and 14 can be implemented, for example, as an individual integrated circuit, or all of the components 12, 13 and 14 could be integrated into a single integrated circuit. Although FIG. 1 illustrates only transmitter and receiver components, the exemplary embodiments of FIG. 3 are also representative of a transceiver component in which, for example, the transmitter 12 and receiver 13 of FIG. 1 are combined. Although the exemplary embodiments of FIG. 3 are hereinafter referred to as transceiver embodiments, the term transceiver should be understood to be indicative of transmitter embodiments such as illustrated at 12 in FIG. 1, receiver embodiments such as illustrated at 13 and 14 in FIG. 1, and combined transmitter/receiver embodiments in which the transmitter and receiver are combined, for example, in a single integrated circuit. The invention is applicable, for example, to transceivers such as Bluetooth transceivers, IEEE 802.11b transceivers, and others.

Figure 2:
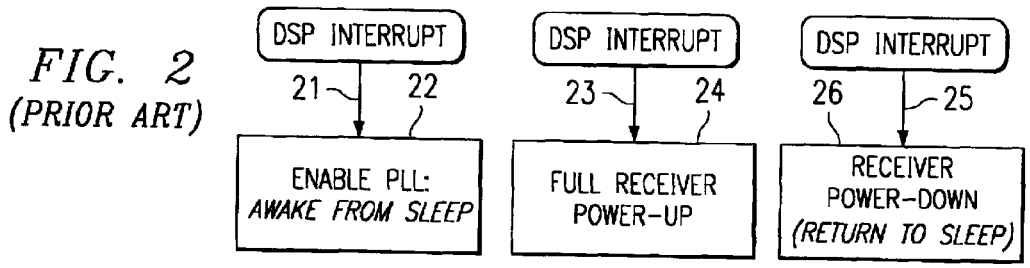
FIG. 2 diagrammatically illustrates a sequence of baseband processor interrupt signals conventionally used for controlling a transceiver function.

The transceiver of FIG. 3 includes a conventional transceiver section 34, designated as Tx/Rx which, as indicated above, is representative of a conventional transmitter section (with or without a power amplification function), a conventional receiver section, or a conventional combined transmitter/receiver section (with or without a power amplification function). The transceiver section 34 includes a disable input and an enable (EN) input, which respectively cause the transceiver section to enter and awaken from a powered-down sleep state wherein either the entire transceiver section, or at least a portion thereof, is in a powered-down sleep state. The transceiver section 34 also receives a frequency signal 36 from a frequency generator circuit 30 such as a PLL (shown in FIG. 3) or a DDFS (direct digital frequency synthesizer). In response to the above-described input signals, the transceiver section 34 performs conventional transceiver operations, for example conventional cellular telephone communication operations or conventional GPS acquisition operations. According to the invention, the aforementioned transceiver enable and disable signals can be generated within the transceiver itself rather than on the baseband processor side as is conventional (see 23 and 25 in FIG. 2). In the embodiment of FIG. 3, the enable and disable signals are respectively driven by the outputs 38 and 39 of a signal selector 35 that is controlled by a mode selector 37.

The mode selector 37 can be programmed from the baseband processor, for example, via a serial programming interface SPI in the communication bus 15 (see also FIG. 1). The mode selector determines whether the enabling and disabling of the transceiver section 34 will be controlled by locally (i.e., transceiver side) generated signals 27 and 29, or by the conventional interrupt signals 23 and 25 (see also FIG. 2) received from the baseband processor (e.g. a DSP) via the communication bus 15 (see also FIG. 1).

The PLL can be enabled by the baseband processor interrupt signal 21 discussed above with respect to FIG. 2. In response to this interrupt signal, the PLL awakens from its sleep state and produces the frequency signal 36 for use by the transceiver section 34. If the mode selector 37 has been programmed for conventional power control operation, then the transceiver section 34 is enabled and subsequently disabled by the conventional software interrupt signals 23 and 25 discussed above with respect to FIG. 2. On the other hand, if the mode selector 37 has been programmed to select local (transceiver side) power control operation, then the transceiver enable and disable signals are driven by the aforementioned signals 27 and 29 as generated locally by a timing sequencer 31. The timing sequencer 31 can be implemented in some embodiments as a state machine that is programmable from the baseband processor side via the serial programming interface SPI. The timing sequencer 31 is operable in response to the initial interrupt signal 21 received from the baseband processor side, is coupled to the PLL at 33 for purposes of PLL lock detection, and also receives the conventionally available PLL comparison frequency 32.

Figure 4:
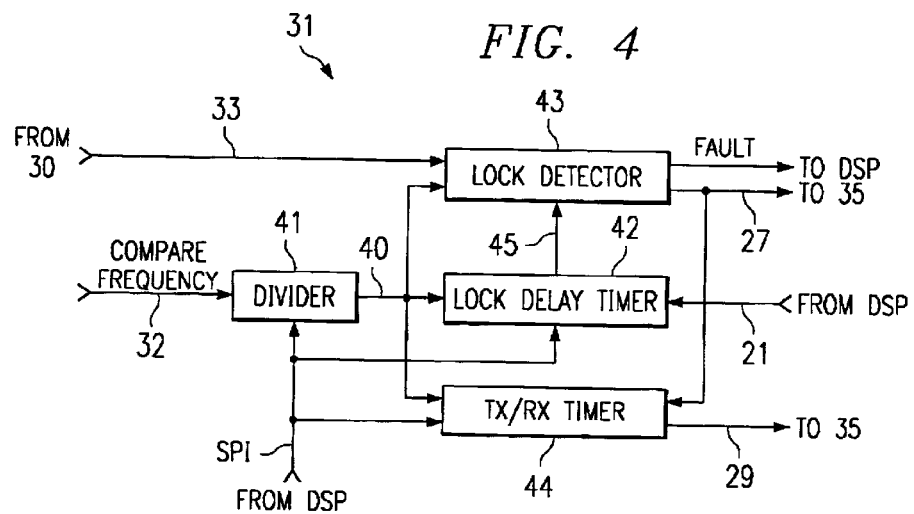
FIG. 4 diagrammatically illustrates pertinent portions of exemplary embodiments of the timing sequencer of FIG. 3.

FIG. 4 diagrammatically illustrates pertinent portions of an exemplary embodiment of the timing sequencer 31. A divider 41 receives the PLL compare frequency 32 (or another system clock) and divides it down into a suitable (e.g. 10 khz) clock signal 40 that is provided to a lock detector 43, a lock delay timer 42 and a transceiver timer 44. The divider 40, lock delay timer 42 and transceiver timer 44 are programmable via the serial programming interface SPI. When the interrupt signal 21 is received from the baseband processor side to wake up the PLL (see also FIGS. 2 and 3), the lock delay timer 42 also receives this interrupt signal and begins timing a delay period during which the PLL is expected to lock its output frequency. In one example, the lock delay time can be programmable from 0 to 6.4 milliseconds in 100 microsecond intervals. The lock delay timer 42 outputs a signal 45 to the lock detector 43 when the lock delay time has elapsed. The lock detector 43 also receives at 33 conventionally available PLL information from which the lock detector can, using conventional techniques, determine whether or not the PLL has locked. If the lock detector 43 determines that the PLL has not yet locked even though the lock delay time has elapsed, then the lock detector 43 outputs a fault indication to the baseband processor. Otherwise, if the lock detector 43 determines that the PLL has locked, then the lock detector activates signal 27 at the input of the signal selector 35 (see also FIG. 3) in order to drive the signal 38 which enables the transceiver section 34.

The signal 27 from the lock detector 43 is also input to the transceiver timer 44 which, in response to activation of the signal 27, begins tracking the time duration of the operation of transceiver section 34. The transceiver timer 44 is programmable via the serial programming interface SPI to track any desired time of operation for the transceiver section 34. For example, if the transceiver section 34 is a GPS receiver, then the GPS acquisition time can be programmed into the transceiver timer 44. As one example, the transceiver timer 44 can be programmed to track a GPS acquisition time within a range of 0 to 17 minutes in four millisecond steps. When the transceiver timer 44 determines that the pre-programmed time has elapsed since activation of the signal 27, the transceiver timer 44 activates the signal 29 at the input of selector 35 in order to drive the selector output 39, which disables the transceiver section 34 and the PLL, thereby returning both of those components into their respective powered-down sleep states. In some embodiments, separate selector outputs can be provided at 39 for permitting the PLL and transceiver section 34 to be disabled independently from one another.

Figure 5:
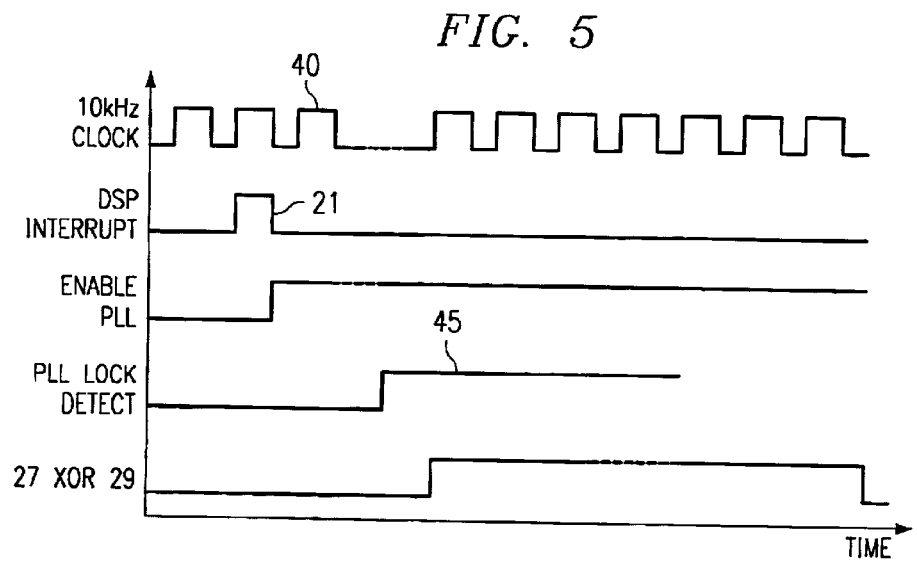
FIG. 5 diagrammatically illustrates exemplary timing relationships among various signals illustrated in FIG. 4.

FIG. 5 is a timing diagram which illustrates exemplary timing relationships between various ones of the above-described signals of FIG. 4.

FIG. 6 illustrates exemplary operations which can be performed by the timing sequencer of FIGS. 3–5. At 61, the divider 40, lock delay timer 42 and transceiver timer 44 are programmed with desired operational parameters. When an interrupt signal is received from the baseband processor side at 62, the frequency generator is enabled at 63, and a frequency generator delay (e.g., the lock delay implemented by lock delay timer 42) begins at 64. After the frequency generator delay has expired, it is determined at 65 whether or not the frequency generator (e.g. PLL) has locked. If not, a fault is indicated at 66, and the next interrupt is awaited at 62.

If it is determined at 65 that the frequency generator (e.g. PLL) has locked, then the transceiver section is enabled at 67 (this can include, in some embodiments, turning on a transceiver power amplifier according to a power ramping profile), and the transceiver operation delay is started at 68. After completion of the transceiver operation delay at 68, the transceiver and frequency generator are disabled at 69 (this can include, in some embodiments, ramping down a transceiver power amplifier), after which the next interrupt is awaited at 62.

FIG. 7 diagrammatically illustrates pertinent portions of further exemplary transceiver embodiments according to the invention. The transceiver of FIG. 7 includes integrated frequency shift control capabilities which can in varying degrees remove the frequency shift control burden from the baseband processor side. The transceiver of FIG. 7 includes shadow registers 74 which can be pre-programmed from the baseband processor (e.g. a DSP or MCU) via a serial programming interface SPI to contain information indicative of desired frequencies among which the frequency generator 70 (shown as a PLL in the example of FIG. 7) is to sequentially shift. For example, each shadow register can include a respective divisor which can be loaded from the shadow register into the feedback loop of a conventional PLL at 70 in order to set a desired output frequency at 77. The use of a feedback divisor (Integer-N or Fractional-N) in a PLL in order to set the PLL output frequency is well known in the art.

The shadow registers 74 are accessible via an input 73 which can control the sequence in which the shadow registers are accessed and their corresponding divisors loaded at 75 into the PLL. As shown by broken line in FIG. 7, the shadow register access sequence information can be received directly from the baseband processor side. In other embodiments, a shadow register accessor 72 receives at 71 control information from the baseband processor side and, responsive to the received control information, produces the shadow register access sequence information at 73.

Figure 8:
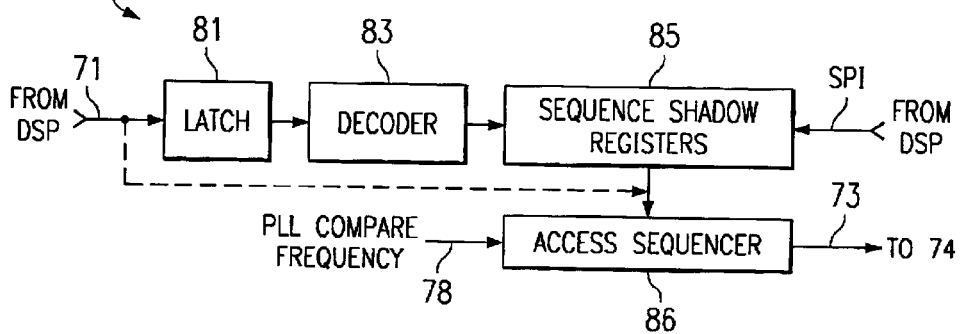
FIG. 8 diagrammatically illustrates pertinent portions of exemplary embodiments of the shadow register accessor of FIG. 7.

FIG. 8 diagrammatically illustrates pertinent portions of exemplary embodiments of the shadow register accessor 72 of FIG. 7. In one embodiment of FIG. 8, sequence shadow registers 85 are employed in combination with an access sequencer 86. The access sequencer 86 (e.g. a programmable state machine) outputs the shadow register access sequence information at 73 in response to information received from the sequence shadow registers 85. Each of the shadow registers 85 can be pre-programmed with frequency shift sequence information from the baseband processor side via the serial programming interface SPI. A control code received from the baseband processor side at 71 is latched at 81 and decoded at 83 in order to select the shadow register 85 which contains the desired frequency shift sequence information. This information is then loaded into the access sequencer 86, which responds thereto by sequentially accessing the shadow registers 74 of FIG. 7, for example, to load into a PLL at 70 the divisor sequence required to implement the desired frequency shift sequence. The access sequencer 86 has an input 78 for receiving a time reference signal (e.g. the PLL compare frequency or other system clock frequency) from which can be derived a suitable time base for sequential access of registers 74. The information in sequence shadow registers 85 can indicate a sequence in which registers 74 are to be accessed, and the desired timing between each access (i.e., between each frequency shift).

In other embodiments, the desired frequency shift sequence information can be loaded directly into the access sequencer 86 from the baseband processor side, as shown by broken line in FIG. 8.

The above-described use of shadow registers in the embodiments of FIGS. 7 and 8 relieves a significant burden from the baseband processor side. For example, in the broken line embodiment of FIG. 7, the baseband processor provides the shadow register access sequence information at 73, but need not provide the specific frequency information, which has already been programmed into the shadow registers 74. In the shadow register accessor embodiment illustrated by broken line in FIG. 8, the baseband processor can load information indicative of the desired frequency shift sequence directly into the access sequencer 86, thereby relieving the baseband processor of the task of directly controlling the sequential access of the shadow registers 74 in FIG. 7. In embodiments which utilize the sequence shadow registers 85, the baseband processor need only provide, for example, a two bit code in order to access any one of four shadow registers 85, each of which can be pre-programmed with frequency shift sequence information for loading into the access sequencer 86.

FIG. 10 diagrammatically illustrates pertinent portions of exemplary embodiments of a transmitter, receiver or transceiver according to the invention. FIG. 10 is generally similar to FIG. 3, and is therefore similarly representative, for example, of any of the components 12, 13 and 14 illustrated in FIG. 1. In FIG. 10, the frequency generator 300 is embodied as a direct digital frequency synthesizer DDFS. The DDFS architecture illustrated in FIG. 10 is well-known in the art, including a phasor look-up table/interpolator 301 for providing N-bit digital codes to a digital-to-analog converter (DAC) whose output is coupled to a filter which filters out quantization noise and higher order harmonic frequency energy. The filter outputs the desired frequency signal 36 to the transceiver section 34 (see also FIG. 3). The phasor look-up table/interpolator 301 and DAC are clocked by a gated clock signal 302 produced at the output of gating logic 303 whose inputs are driven by a clock signal 320, the interrupt signal 21 (see also FIG. 3) received from the baseband processor (e.g. a DSP), and the output 39 of a signal selector 35 (see also FIG. 3). The interrupt signal 21 drives an enable (EN) input of the DDFS, and thereby serves to enable the phasor look-up table/interpolator 301 and the clock signal 320 (via gating logic 303). This causes the DDFS to awaken from its powered-down sleep state and assume its powered-up operating state.

The N-bit digital codes contained in the phasor look-up table/interpolator 301 can be loaded therein from the baseband processor via, for example, a serial programming interface (SPI). In some embodiments, the codes can be downloaded from any suitable memory device. In other embodiments, an appropriate sinusoid generator function can be integrated within the DDFS in order to populate the coefficients of the look-up table. The baseband processor can also provide, for example, via the serial programming interface SPI, information indicative of the radians per clock cycle at which the DDFS is to operate.

The embodiments of FIG. 10 also include a timing sequencer 310 which produces output signals 270 and 290 for input to a signal selector 35 (such as described above with respect to FIG. 3) whose outputs 38 and 39 respectively drive enable and disable inputs of the transceiver section 34. The output 39 is also used at gating logic 303 to disable the gated clock signal 302, and the output 39 could also be used, in some embodiments, to disable operation of the phasor look-up table/interpolator 301 of the DDFS. The timing sequencer 310 receives as inputs the clock signal 320 and the interrupt signal 21, and is also programmable from the baseband processor via the serial programming interface SPI.

FIG. 11 diagrammatically illustrates pertinent portions of exemplary embodiments of the timing sequencer 310 of FIG. 10. The timing sequencer of FIG. 11 includes a clock divider 410 similar to the clock divider 41 of FIG. 4, and a transceiver timer 440 similar to the transceiver timer 44 of FIG. 4. The clock divider 410 receives the clock signal 320 and can divide this signal appropriately to produce a desired clock signal 400. The clock signal 400 is input to the transceiver timer 440 and to a programmable delay timer 110. The timers 110 and 440, and the clock divider 410 are all programmable from the baseband processor via the serial programming interface SPI. The interrupt signal 21 from the baseband processor is input to the programmable delay timer 110, which implements a desired delay, for example a delay time which is adequate to avoid any undesirable start-up noise in the frequency signal 36 initially produced by the DDFS 300 of FIG. 10. After the delay period has expired, the timer 110 activates the signal 270, which in turn enables the transceiver section 34 of FIG. 10 (via selector 35) and the transceiver timer 440 of FIG. 11. At this point, the transceiver section 34 awakens from its powered-down sleep state and begins its normal powered-up operations, and the transceiver timer 440 begins tracking the operational time of the transceiver section 34. When the timer 440 expires, it activates the signal 290, thereby disabling (via selector 35) the transceiver section 34 and the DDFS 300 (see also FIG. 10) into their sleep states.

Referring again to FIG. 6, exemplary operations illustrated therein can also be performed by the timing sequencer embodiments of FIGS. 10 and 11. In particular, with the exception of operations 65 and 66, all operations illustrated in FIG. 6 can also be performed by the embodiments of FIGS. 10 and 11. Operations of the embodiments of FIGS. 10 and 11 are thus illustrated by considering the broken line of FIG. 6.

FIG. 12 is generally similar to FIG. 7, but illustrates that information from shadow registers 74 can be loaded into the phasor look-up table/interpolator of a DDFS 120. In the embodiments of FIG. 12, the shadow registers 74 contain, for example, information indicative of various radians per clock cycle values associated with various desired frequencies in a frequency shift sequence to be executed by the DDFS 120. Exemplary embodiments of the shadow register accessor 72 and the shadow registers 74 are described above with respect to FIGS. 7 and 8.

Figure 9:
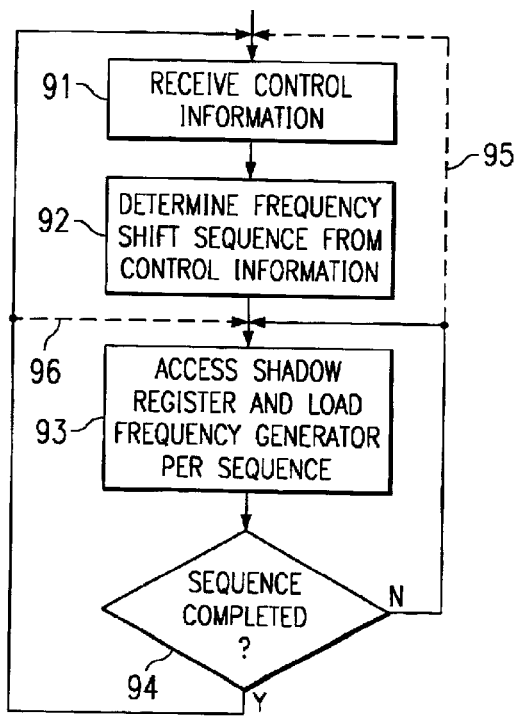
FIG. 9 illustrates exemplary operations which can be performed by the transmitter/receiver embodiments of FIGS. 7 and 8.

FIG. 9 illustrates exemplary operations which can be performed by the embodiments of FIGS. 7, 8 and 12. After the appropriate control information is received from the baseband processor side at 91, the frequency shift sequence is determined at 92 in response to the control information. At 93, a shadow register is accessed according to the frequency shift sequence, and the information (e.g. PLL divisor or DDFS radians per clock cycle) from the accessed shadow register is loaded into the frequency generator. The sequence of accessing information from a shadow register and loading the frequency generator with the accessed information is continued at 93 until the sequence is completed at 94. The broken line 95 in FIG. 9 corresponds to the broken line embodiments of FIGS. 7 and 12, wherein each information element of the sequence is individually communicated from the baseband processor side. The broken line at 96 in FIG. 9 illustrates that, in some embodiments, the frequency shift sequence can be repeated as desired.

The operations illustrated in FIG. 9 can be performed, for example, during the transceiver operation delay 68 of FIG. 6. Thus, the PLL of FIG. 3 and DDFS of FIG. 10 can be controlled in the manner described with respect to FIGS. 7–9 (FIGS. 7–9 and 12 for DDFS) during the period of transceiver operation tracked by the transceiver timers 44 and 440 of FIGS. 4 and 11 (and indicated by the delay 68 of FIG. 6). Accordingly, the capability of loading the PLL of FIG. 3 and DDFS of FIG. 10 from the shadow registers 74 of FIGS. 7 and 12 is also indicated in FIGS. 3 and 10. In some embodiments, the arrangements of FIGS. 7, 8 and 12 can shift to the next desired frequency while the transceiver section 34 of FIGS. 3 and 10 is powered down (e.g., between operations 69 and 63 in FIG. 6).

It will be evident to workers in the art that the embodiments of FIGS. 1 and 3–12 can be readily implemented, for example, by suitable modifications in software, hardware, or a combination of software and hardware, in conventional portable wireless communication terminals.

Although exemplary embodiments of the invention are described above in detail, this does not limit the scope of the invention, which can be practiced in a variety of embodiments.

What is claimed is:

1. A transceiver apparatus for use in a portable wireless communication terminal, comprising:

a transceiver section for supporting wireless communication operations of the portable wireless communication terminal, including an input to which at least a portion of said transceiver section is responsive for entering either of a powered-down state and a powered-up state; and a timing sequencer coupled to said input for signaling said transceiver section to enter said powered-up and powered-down states in a desired sequence to perform a desired operation, said timing sequencer including an input for receiving from a baseband processor a signal requesting the desired operation, said timing sequencer responsive to the baseband processor signal for signaling said desired power-up/power-down sequence to said transceiver section without requiring further signaling from the baseband processor.

2. The apparatus of claim 1, including a frequency generator coupled to said transceiver section for providing a frequency signal to said transceiver section, said timing sequencer coupled to said frequency generator for receiving therefrom information indicative of whether said frequency generator has achieved a locked state, said timing sequencer selectively responsive to said locked state information for signaling said transceiver section to enter said powered-up state.

3. The apparatus of claim 2, wherein said frequency generator has an input for receiving said baseband processor signal, said frequency generator responsive to said baseband processor signal for leaving a powered-down state thereof and entering a powered-up state thereof, said timing sequencer coupled to said frequency generator for signaling said frequency generator to leave said powered-up state thereof and enter said powered-down state thereof.

4. The apparatus of claim 2, wherein said frequency generator includes a phase locked loop(PLL).

5. The apparatus of claim 2, wherein said frequency generator includes a direct digital frequency synthesizer (DDFS).

6. The apparatus of claim 2, wherein said timing sequencer includes a lock delay timer coupled to said timing sequencer input and responsive to said baseband processor signal for tracking a delay time during which said frequency generator is expected to achieve said locked state, said timing sequencer further including a lock detector coupled to said lock delay timer and said frequency generator, said lock detector responsive to expiration of said delay time for detecting from said frequency generator locked state information whether said frequency generator has achieved said locked state, said lock detector responsive to detection of said locked state for signaling said transceiver section to enter said powered-up state.

7. The apparatus of claim 6, including a serial programming interface coupled to said lock delay timer for permitting the baseband processor to program said delay time into said lock delay timer.

8. The apparatus of claim 6, wherein said timing sequencer includes a transceiver timer coupled to said lock detector and responsive to detection of said locked state for tracking a further delay time associated with operation of said transceiver section, said transceiver timer responsive to expiration of said further delay time for signaling said transceiver section to enter said powered-down state.

9. The apparatus of claim 2, wherein said timing sequencer includes a transceiver timer responsive to said locked state information for tracking a delay time associated with operation of said transceiver section, said transceiver timer responsive to expiration of said delay time for signaling said transceiver section to enter said powered-down state.

10. The apparatus of claim 9, including a serial programming interface coupled to said transceiver timer for permitting the baseband processor to program said delay time into said transceiver timer.

11. The apparatus of claim 1, including a selection apparatus coupled between said timing sequencer and said transceiver section input for selecting one of said timing sequencer and the baseband processor for connection to said transceiver section input.

12. The apparatus of claim 11, including a serial programming interface coupled to said selection apparatus for permitting the baseband processor to program the desired selection into said selection apparatus.

13. The apparatus of claim 1, wherein said timing sequencer includes a programmable state machine.

14. The apparatus of claim 13, including a serial programming interface coupled to said programmable state machine for permitting the baseband processor to program said programmable state machine.

15. The apparatus of claim 1, provided on a single integrated circuit.

16. A transceiver apparatus for use in a portable wireless communication terminal, comprising:

a transceiver section for supporting wireless communication operations of the portable wireless communication terminal;

a frequency generator having an output coupled to said transceiver section for providing thereto a frequency signal;

a plurality of registers coupled to said frequency generator, each of said registers for storing therein information indicative of a respective one of a plurality of frequencies to which said frequency signal is to be sequentially shifted; and an input for coupling to a baseband processor of the portable wireless communication terminal to receive therefrom information indicative of a desired sequence of frequencies through which said frequency signal is to be shifted, said registers coupled to said input and responsive to said desired sequence information for providing their respective frequency information to said frequency generator sequentially according to said desired sequence.

17. The apparatus of claim 16, wherein said input is connected to said registers for permitting the baseband processor to directly access said registers sequentially using said desired sequence information.

18. The apparatus of claim 16, including a register accessor coupled between said input and said registers, said register accessor responsive to said desired sequence information for accessing said registers sequentially according to said desired sequence.

19. The apparatus of claim 18, wherein said register accessor includes further registers for respectively storing therein information indicative of respective sequences of frequencies through which said frequency signal can be shifted, said register accessor including an access sequencer coupled to said further registers for receiving from said further registers said stored frequency sequence information, said access sequencer responsive to said received frequency sequence information for accessing said first-mentioned registers sequentially according to said received frequency sequence information.

20. The apparatus of claim 19, wherein said register accessor is responsive to said desired sequence information for accessing one of said further registers corresponding to said desired sequence and for loading said access sequencer with the frequency sequence information stored in said one of said further registers.

21. A The apparatus of claim 20, wherein said register accessor includes a decoder coupled between said input and said further registers for decoding said desired sequence information to produce information indicative of said one of said further registers that is to be accessed for loading said access sequencer.

22. The apparatus of claim 19, including a serial programming interface coupled to said further registers for permitting the baseband processor to load said frequency sequence information into said further registers.

23. The apparatus of claim 19, wherein said access sequencer includes a programmable state machine that is programmable with said frequency sequence information.

24. The apparatus of claim 18, wherein said register accessor includes a programmable state machine that is connected to said input and is programmable with said desired sequence information.

25. The apparatus of claim 16, wherein said frequency generator includes a phase locked loop (PLL).

26. The apparatus of claim 16, wherein said frequency generator includes a direct digital frequency synthesizer (DDFS).

27. A method of controlling a transceiver section provided on a transceiver side of a portable wireless communication terminal that also includes a baseband side coupled to the transceiver side, comprising:

receiving on the transceiver side a signal from the baseband side requesting a desired transceiver operation; and in response to said requesting signal from the baseband side, signaling at least a portion of the transceiver section to enter a powered-up state thereof and a powered-down state thereof in a desired sequence, including generating on the transceiver side signaling that produces the desired power-up/power-down sequence without requiring further signaling from the baseband side.

28. The method of claim 27, including enabling a frequency generator in response to said requesting signal from the baseband side, waiting for a first predetermined amount of time after enabling the frequency generator, and determining, after expiration of the first predetermined amount of time, whether the frequency generator has achieved a locked state.

29. The method of claim 28, wherein said generating step includes, in response to a determination that the frequency generator has achieved a locked state, generating a signal that drives the transceiver section into said powered-up state thereof, waiting for a second predetermined amount of time, and generating, after expiration of the second predetermined amount of time, a signal that places the transceiver section into said powered-down state thereof.

30. A method of controlling a frequency generator provided on a transceiver side of a portable wireless communication terminal that also includes a baseband side coupled to the transceiver side, comprising:

storing on the transceiver side information indicative of a plurality of frequencies to which a frequency signal output of the frequency generator is to be sequentially shifted;

thereafter, receiving on the transceiver side from the baseband side information indicative of a desired sequence of frequencies through which said frequency signal is to be shifted; and responsive to said desired sequence information, using the stored frequency information to shift said frequency signal through the desired sequence of frequencies.

31. The method of claim 30, wherein said stored frequency information includes divisors for use in a feedback loop of a PLL, said using step including sequentially loading the divisors into the feedback loop.

32. The method of claim 30, wherein said stored frequency information includes radians per clock cycle values for use in a DDFS, said using step including sequentially loading the values into the DDFS.

33. The method of claim 30, including storing on the transceiver side information indicative of sequences of frequencies through which said frequency signal can be shifted, said using step including using said stored frequency information and said stored frequency sequence information to shift said frequency signal through the desired sequence of frequencies.

34. The method of claim 33, wherein said last-mentioned using step includes accessing said stored frequency information in response to said stored frequency sequence information.

* * * * *